(12) United States Patent
Sakura et al.

(10) Patent No.: US 8,118,699 B2
(45) Date of Patent: *Feb. 21, 2012

(54) SPROCKET FOR CHAIN

(75) Inventors: Shunji Sakura, Osaka (JP); Akira Hirai, Osaka (JP); Yuji Kurematsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 240 days.

This patent is subject to a terminal disclaimer.

(21) Appl. No.: 12/408,068

(22) Filed: Mar. 20, 2009

(65) Prior Publication Data

US 2009/0286639 A1 Nov. 19, 2009

(30) Foreign Application Priority Data

May 13, 2008 (JP) ................................. 2008-126256

(51) Int. Cl.
*F16H 55/30* (2006.01)

(52) U.S. Cl. .................... 474/152; 474/154; 474/160

(58) Field of Classification Search .................. 474/152, 474/154, 157, 160, 202–203
See application file for complete search history.

(56) References Cited

U.S. PATENT DOCUMENTS

| | | | |
|---|---|---|---|
| 7,128,673 B2 | 10/2006 | Kubo et al. | |
| 7,442,139 B2 * | 10/2008 | Kubo et al. | 474/152 |
| 7,534,182 B2 * | 5/2009 | Sonoda | 474/152 |
| 7,691,020 B2 * | 4/2010 | Sakura et al. | 474/156 |
| 7,699,733 B2 * | 4/2010 | Sakura et al. | 474/161 |
| 7,713,156 B2 * | 5/2010 | Sakura et al. | 474/161 |
| 2006/0135304 A1 | 6/2006 | Sonoda | |
| 2008/0161144 A1 * | 7/2008 | Hirai et al. | 474/141 |
| 2009/0209380 A1 * | 8/2009 | Hirai et al. | 474/156 |
| 2009/0286640 A1 * | 11/2009 | Sakura et al. | 474/153 |

FOREIGN PATENT DOCUMENTS

JP 7-18478 3/1995

OTHER PUBLICATIONS

Akira Hirai et al., Sprocket for Chain, U.S. Appl. No. 12/363,730.
Shunji Sakura et al., Sprocket for Chain, U.S. Appl. No. 12/409,764.

* cited by examiner

*Primary Examiner* — Sang Kim

(74) *Attorney, Agent, or Firm* — Howson & Howson LLP

(57) ABSTRACT

A sprocket for a chain drive using a roller or bushing chain has a plurality of different pitch angles, including both pitch angles larger than the standard pitch angle, and pitch angles smaller than the standard pitch angle. The number of pitch angles in the sprocket larger than the standard pitch angle is greater than the number of pitch angles in the sprocket smaller than the standard pitch angle. The sprocket teeth are integrally molded with the sprocket by sintering.

8 Claims, 6 Drawing Sheets

SPROCKET FOR CHAIN

CROSS-REFERENCE TO RELATED APPLICATION

This application claims priority on the basis of Japanese patent application 2008-126256, filed May 13, 2008. The disclosure of Japanese application 2008-126256 is hereby incorporated by reference.

FIELD OF THE INVENTION

The invention relates to a sprocket for use with a transmission chain. The periphery of the sprocket has a plurality of teeth separated from one another by tooth grooves, each groove having a tooth gap bottom continuous with facing surfaces of two adjacent teeth. In a chain transmission, rollers of a roller chain, or bushings of a bushing chain, engage with the tooth gaps. It is desirable to reduce noises generated when the roller of a roller chain or the bushing of a bushing chain engages with a sprocket tooth, and to achieve smooth disengagement of the rollers or bushings from the sprocket.

BACKGROUND OF THE INVENTION

Chain transmissions in which a chain is in meshing engagement with a driving sprocket and one or more driven sprockets are used widely. Regardless of the environment in which they are used, it is generally desirable to reduce the noise level generated in the operation of such chain transmissions When the chain transmission is used as a timing transmission in an internal combustion engine, to transmit power from an engine crankshaft to one or more camshafts for operating intake and exhaust valves, it needs to meet the demand for high power output and high combustion efficiency, and meet environmental concerns as well. Thus, whereas the load on the timing transmission has increased, there is a conflicting demand for reduction of the noise generated by the transmission to a negligible level.

Countermeasures for reducing noise in an automobile engine have included the use of sound-absorbing materials such as rubber. However, where the load on the timing transmission is at a high level, and chain tension is high, it has become difficult to suppress noise sufficiently.

These chain transmissions are defined in Japanese Industrial Standards (JIS) as JIS B1801-1997 (Transmitting roller chain and Bushing chain), and the sprocket tooth forms (S tooth form and U tooth form) are also defined in a reference ("Shapes and Sizes of Sprocket") attached to JIS B1801-1997. Further, tooth forms for chains and sprockets according to the International Standards Organization (ISO tooth forms) are defined in ISO 606:1994 (E). Conventional chain transmissions utilizing roller chains or bushing chains together with sprockets are generally made in accordance with these standards.

FIGS. 5 and 6 depict a conventional chain transmission, composed of a standard roller chain 150, and a standard sprocket 500 having an ISO tooth form. FIG. 6 is an enlarged view of a portion Y in FIG. 5.

The ISO tooth forms shown in FIGS. 5 and 6 are defined by the following expressions from ISO 606:1994 (E).

$d = p/\sin(180°/z)$ (Pitch circle diameter)

$df = d - d1$ (Diameter of tooth gap bottom circle, or "root diameter")

$dc = df$ Caliper diameter for a sprocket having an even number of teeth $dc = d \times \cos(90°/z) - d1$ Caliper diameter for a sprocket having an odd number of teeth $re(\max) = 0.12 \times d1(z+2)$ Maximum of radius of tooth head arc $ri(\min) = 0.505 \times d1$ Minimum of radius of tooth gap bottom arc $re(\min) = 0.008 \times d1(z^2+180)$ Minimum of radius of tooth head arc $ri(\max) = 0.505 \times d1 + 0.069(d1)^{1/3}$ Maximum of radius of tooth gap bottom arc In the above formulae,
p is the roller chain pitch,
d is a pitch circle diameter,
d1 is the outer diameter of a chain roller,
df is the diameter of the tooth gap bottom circle, i.e., the root diameter,
dc is a caliper diameter,
re(max) is the maximum of the radius of the tooth head arc,
ri(min) is the minimum of the radius of tooth gap bottom arc,
re(min) is the minimum of the radius of the tooth head arc,
ri(max) is the maximum of the radius of the tooth gap bottom arc, and
z is the number of sprocket teeth.

In FIGS. 5 and 6, pa is the chordal pitch of the sprocket, which is equal to the chain pitch p. As apparent from the above expressions, in the standard sprocket 500, shown in FIG. 6, the tooth gap bottom 503 of the ISO tooth form is in the form of an arc having a radius ri slightly larger than the radius (d1/2) of roller 152. The tooth surface 502 is in the formed of an arc having a radius re. The tooth surfaces 502 on both sides of a tooth gap are continuous with the tooth gap bottom 503. The diameter df of the tooth gap bottom circle, is equal to the difference between the pitch circle diameter d and the roller diameter d1. The diameter df of the tooth gap bottom circle is substantially the same as the difference between the pitch circle diameter d and two times the radius ri of the tooth gap bottom arc.

The standard chain 150 includes inner links and outer links arranged in alternating, overlapping relationship along the length of the chain. In each inner link, both ends of each of two bushings are respectively press-fit into bushing holes in a pair of inner plates. Rollers, each having an outer diameter d1, are rotatable on the bushings. In each outer link, both ends of two connecting pins are respectively press-fitted into pin holes of a pair of outer plates. The chain is assembled in such a way that each of the two connecting pins of an outer link extends through a bushing of a different adjacent inner link, so that the links are connected together. The bushings are rotatable on the connecting pins to allow articulation of the chain. The standard roller chain 150 has a uniform chain pitch p, i.e., a uniform distance between the centers of its respective rollers.

In the standard sprocket 500, as shown in FIGS. 5 and 6, the tooth gap bottom 503 and the tooth surface 502, which are continuous with the tooth gap bottom 503, are symmetrical with respect to a center line X extending radially from the rotational center O of the sprocket through center of the tooth gap bottom 503. The tooth form pitch angle θ is the angle formed by adjacent center lines X, and, is determined by the number of teeth on the sprocket. That is, the tooth pitch angle θ=360°/z. The tooth form pitch pa is the distance between intersection points a, where the radial center lines X intersect the pitch circle pc. Therefore, the tooth form pitch pa is the length of a chord corresponding to the tooth form pitch angle θ. Since, in the standard sprocket 500, the tooth form pitch angles θ are all the same, the chordal tooth form pitch pa is uniform along the circumference of the pitch circle pc. Furthermore, the chordal tooth form pitch pa is made equal to the chain pitch p.

In another approach to reduction of engagement noise, described in Japanese Examined Patent Application No. Hei 7-18478, the outer diameter the rollers of a roller chain is made larger than the standard size so that, as each roller abuts the opposed surfaces of a pair of adjacent sprocket teeth, a clearance exists between the roller and the tooth gap bottom. The tooth gap bottom is in the form of an arc having a diameter slightly smaller than the outer diameter of the roller. As the roller slides on the tooth surfaces and seats on the tooth gap bottom elastic deformation of the roller and/or the tooth surfaces takes place.

In a conventional transmission device comprising a standard roller chain and a standard sprocket, when the standard sprocket rotates in the clockwise direction as shown in FIG. 5, a following roller 152 moves, relative to a seated preceding roller, circumferentially about the center c of the preceding roller, in an arc having a radius equal to the chain pitch p. The following roller then comes into a substantially right angle collision with a tooth gap bottom. Thus, upon engagement of the following roller 152 with the tooth gap bottom the kinetic energy of the roller is transmitted to the tooth gap bottom without buffering, generating a large amount of vibration and noise.

Since the chordal tooth form pitch pa of the standard sprocket 500 is the same as a pitch p of the standard roller chain 150, each roller 152 abuts the tooth gap bottom of the standard sprocket 500 at the same abutment position. Therefore, the timing of engagement of the rollers 152 with the tooth gap bottoms of the sprocket is uniform, and the frequency of the vibration and noise generated corresponds to the number of sprocket teeth.

In the low noise chain transmission disclosed in Japanese Examined Patent Application No. Hei 7-18478, the angle, formed by a line tangent to the position at which the roller abuts a sprocket tooth surface when the roller seats on the tooth gap bottom and a line connecting the center of the roller and the center of said sprocket, is a small angle. Elastic deformation of the roller and/or the tooth surfaces takes place, and the impact is alleviated so that engagement noise is reduced. However since the roller becomes sandwiched between opposed tooth surfaces, smooth disengagement of the roller from the sprocket is prevented, and vibration of the chain takes place on the side at which the chain disengages from the sprocket, generating noise.

Objects of the invention are to solve the above-described problems, to provide a sprocket in which the vibration and noise are reduced and in which disengagement of a chain from the sprocket is smooth, and at the same time, to simplify manufacture of the sprocket, and reduce frictional noise.

SUMMARY OF THE INVENTION

In the sprocket according to the invention, the sprocket teeth are separated by grooves for receiving rollers or bushings of a transmission chain. In each groove, facing tooth surfaces are continuous with a tooth gap bottom. The sprocket has a plurality of different pitch angles. These different pitch angles include pitch angles larger than the standard pitch angle, i.e., an angle θ=360°/z, where z is the number of teeth on the sprocket. The pitch angles also include pitch angles smaller than the standard pitch angle. The number of pitch angles in the sprocket that are larger than the standard pitch angle is greater than the number of pitch angles in the sprocket that are smaller than the standard pitch angle. The sprocket teeth are integrally molded with the entire sprocket by sintering.

The timing of the collision of the chain rollers or bushings with the sprocket is shifted, and the kinetic energy of the impact of the rollers or bushings with the sprocket teeth is reduced. Vibration at a frequency corresponding to the number of sprocket teeth multiplied by the rate of rotation of the sprocket is therefore reduced. Furthermore, since there is a large difference between the overall noise and the noise at a frequency corresponding to the number of sprocket teeth multiplied by the rate of rotation of the sprocket is large, "gating" noises are reduced.

Since the pitch angles are arranged irregularly, and the pitch angles larger than the standard pitch angle are greater than the number of pitch angles smaller than the standard pitch angle, vibration and noise can be reliably reduced without impairing the endurance of the sprocket.

Since the teeth are integrally molded with the sprocket by sintering, neither machining requiring complicated control, nor rolling, is needed. Consequently, manufacture of the sprocket is easy. Furthermore, since more lubricant can be held in the surface of a sintered sprocket than in a conventional sprocket, frictional noise, due to sliding contact of a bushing or roller of a chain with the plural sprocket teeth having a varying pitch, is reduced.

Where the value of the standard tooth form pitch angle is θ, the minimum pitch angle is θ−Δθ, and the maximum pitch angle is less than θ+Δθ, vibration and noise can be even more reliably reduced without impairment of the endurance of the sprocket.

Preferably, the root diameter of the sprocket is greater than the root diameter of a standard sprocket having the same pitch circle diameter and the same number of teeth. A roller or bushing comes into engagement with a back tooth surface of a tooth in substantially tangential direction. Therefore, the impact due to movement of the roller or bushing relative to the sprocket is low, and vibration and noise due to the impact of the roller or bushing with the sprocket can be reduced. Additionally, when a preceding roller and bushing moves relatively about an immediately following roller or bushing on disengagement from the sprocket, the preceding roller or bushing separates smoothly from the sprocket, and a further reduction of vibration and noise can be realized.

DETAILED DESCRIPTION OF THE PREFERRED EMBODIMENTS

In the sprocket according to the invention, the sprocket teeth have a plurality of different pitch angles. The number of pitch angles larger than the standard pitch angle is greater than the number of pitch angles smaller than the standard pitch angle. In addition, the teeth of the sprocket are integrally molded as parts of the entire sprocket by sintering. That is, the sprocket is a sintered sprocket. The effects include a significant reduction in vibration and noise generated as a chain engages the sprocket, smooth disengagement of the chain from the sprocket, ease of manufacture of the sprocket, and reduced frictional noise.

The advantages of the invention can be realized in any of a wide variety of embodiments. For example, the sprocket can have any desired number of teeth, and two or more different pitch angles. In a case of a sprocket having three or more different pitch angles, one of the pitch angles can be the standard pitch angle.

Figure 1:
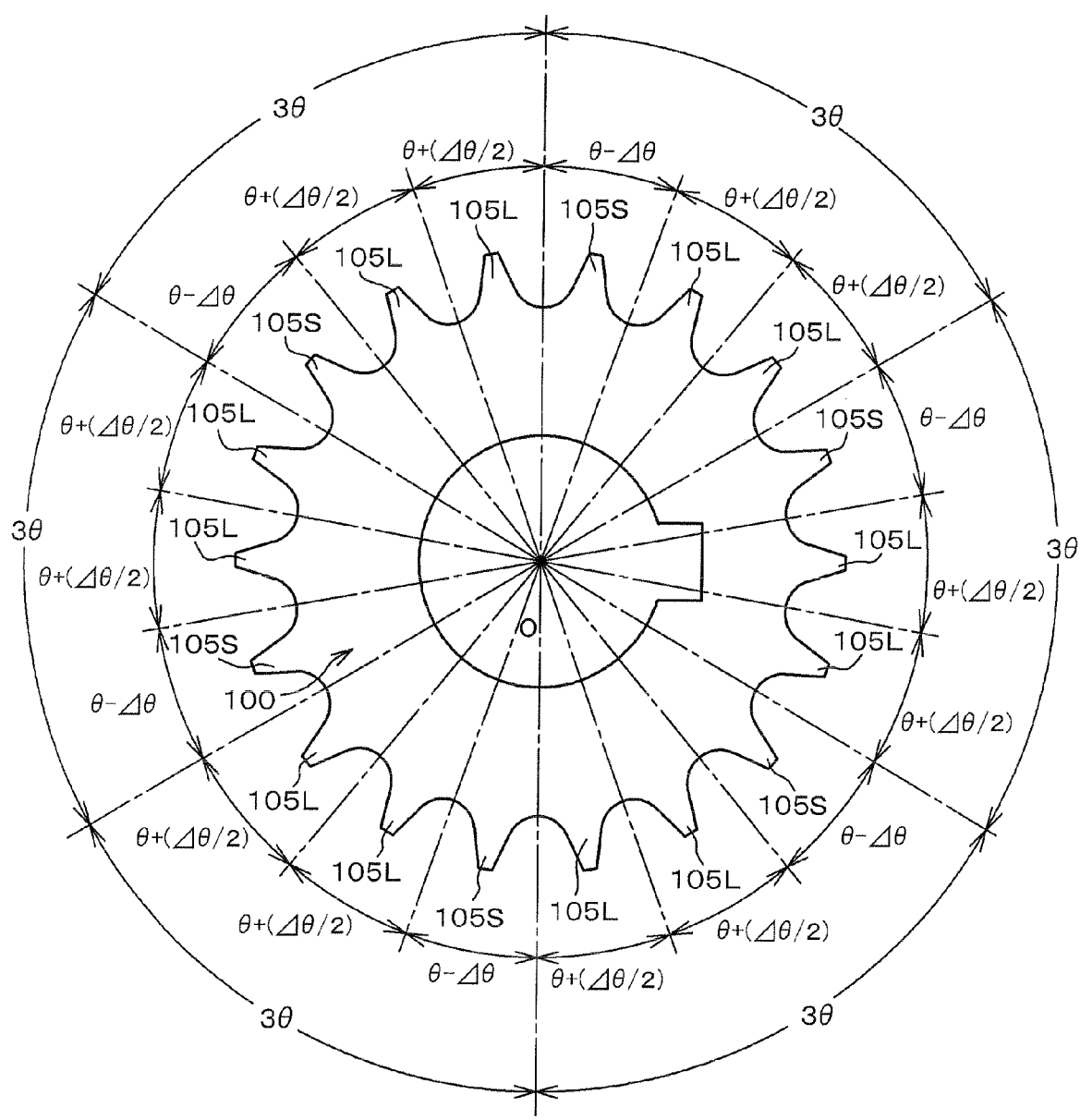
FIG. 1 is an elevational view of a sprocket according to a first embodiment of the invention.

As shown in FIG. 1, a sprocket 100 has eighteen teeth, and two different pitch angles. Teeth 105S have a pitch angle $\theta-\Delta\theta$, teeth 105L have a pitch angle $\theta+(\Delta\theta/2)$, where $\theta$ is the standard pitch angle $360°/z$, z being the number of sprocket teeth. Thus, in this case, $\theta=20°$. $\Delta\theta$ is a fraction of the standard pitch angle $\theta$, preferably less than ¼ of the standard pitch angle $\theta$, so that the pitch angles are all within a range in which a standard chain is able to engage with the sprocket. That is, $\Delta\theta<\theta/4$.

Sprocket 100 has six sets of teeth, each set consisting of a tooth 105S having a pitch angle $\theta-\Delta\theta$, and two teeth 105L, each having a pitch angle $\theta+(\Delta\theta/2)$. Each set of three teeth subtends an angle equal to $3\theta$. This angle $3\theta$ is the same as the sum of the pitch angles of three sprocket teeth each having a standard pitch angle $\theta$. The sets of three teeth are repeated around the circumference of the sprocket in the direction of the pitch circle pc101 (FIG. 2), resulting in a sprocket having an arrangement of teeth that is irregular in the sense that it has at least two different kinds of teeth, having different pitch angles, respectively. Thus, the sprocket has twelve teeth 105L, each having a pitch angle $\theta+(\Delta\theta/2)$, which is larger than the standard pitch angle $\theta$, and six teeth 105S, each having a pitch angle $\theta-\Delta\theta$, which is smaller than the standard pitch angle $\theta$. The number of teeth having a pitch angle greater than $\theta$ exceeds the number of teeth having a pitch angle less than $\theta$. The maximum tooth form pitch angle $\theta+(\Delta\theta/2)$ is less than $\theta+\Delta\theta$.

Whereas in the example shown in FIG. 1 the number of sprocket teeth is eighteen, the number of teeth is not limited to eighteen, nor is it limited to an integer divisible by three. For example, the sprocket of the invention can be realized in an embodiment having a number of teeth having a pitch angle of $\theta-\Delta\theta$, twice that many teeth having a pitch angle of $\theta+(\Delta\theta/2)$, and one or more teeth having a standard pitch angle $\theta$. The teeth having the standard pitch angle $\theta$ may be arranged at any positions.

Furthermore, while some of the sets of teeth can be composed of a tooth having pitch angle $\theta-\Delta\theta$ and two teeth each having a pitch angle $\theta+(\Delta\theta/2)$, other sets of teeth can be composed of three teeth, each having a pitch angle $\theta$. Here again, the teeth having the pitch angle $\theta$ may be arranged at any positions.

Figure 2:
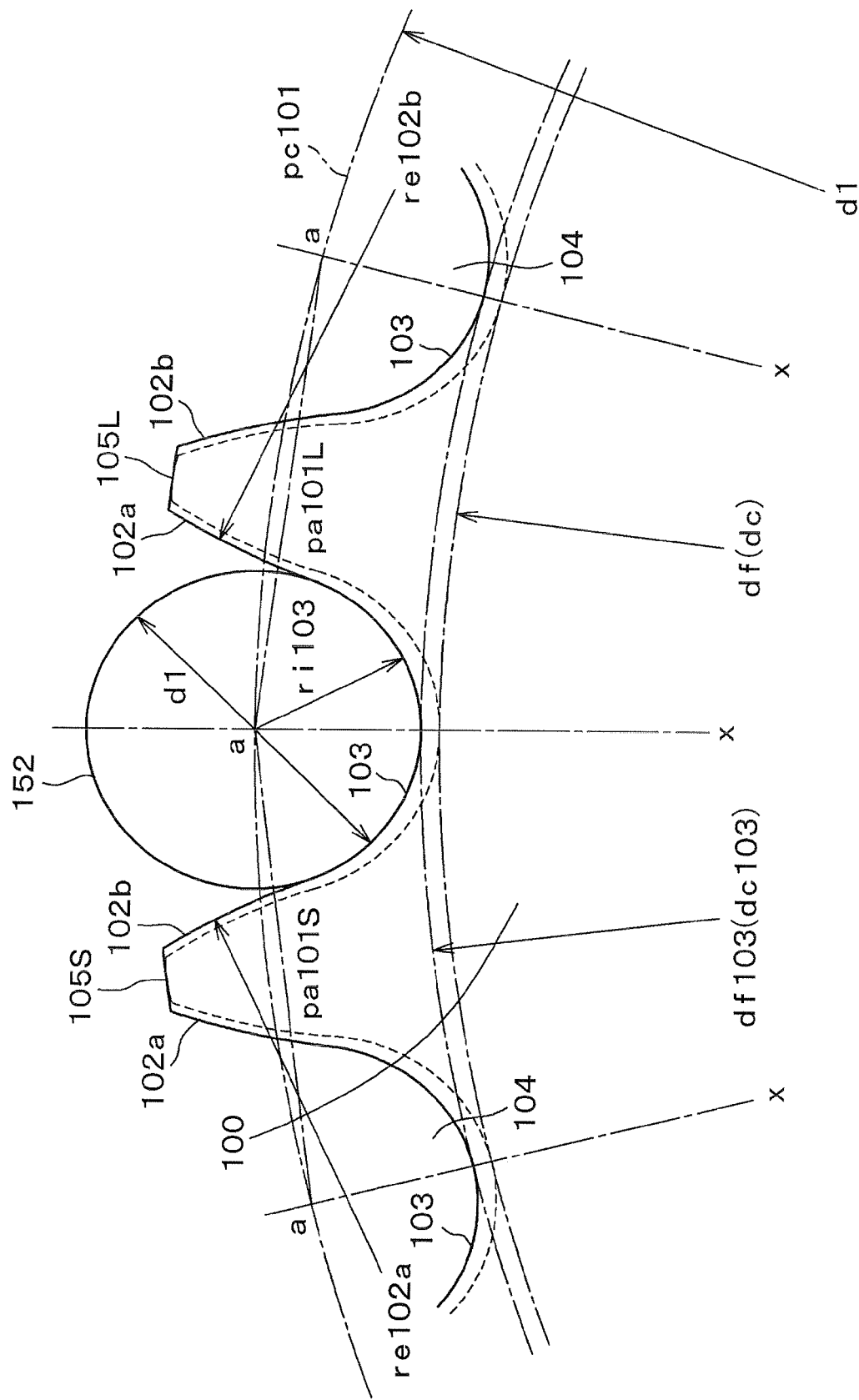
FIG. 2 is an enlarged elevational view of a part of the sprocket of FIG. 1, showing the tooth forms of the sprocket.

As shown in FIG. 2 each tooth groove is defined by two facing tooth surfaces 102a and 102b, and a tooth gap bottom 103, with which the facing tooth surfaces are continuous.

For comparison, in FIG. 2, a broken line shows the shapes of teeth having the standard ISO tooth form and the same pitch angles as those of teeth 105S and 105L.

Figure 6:
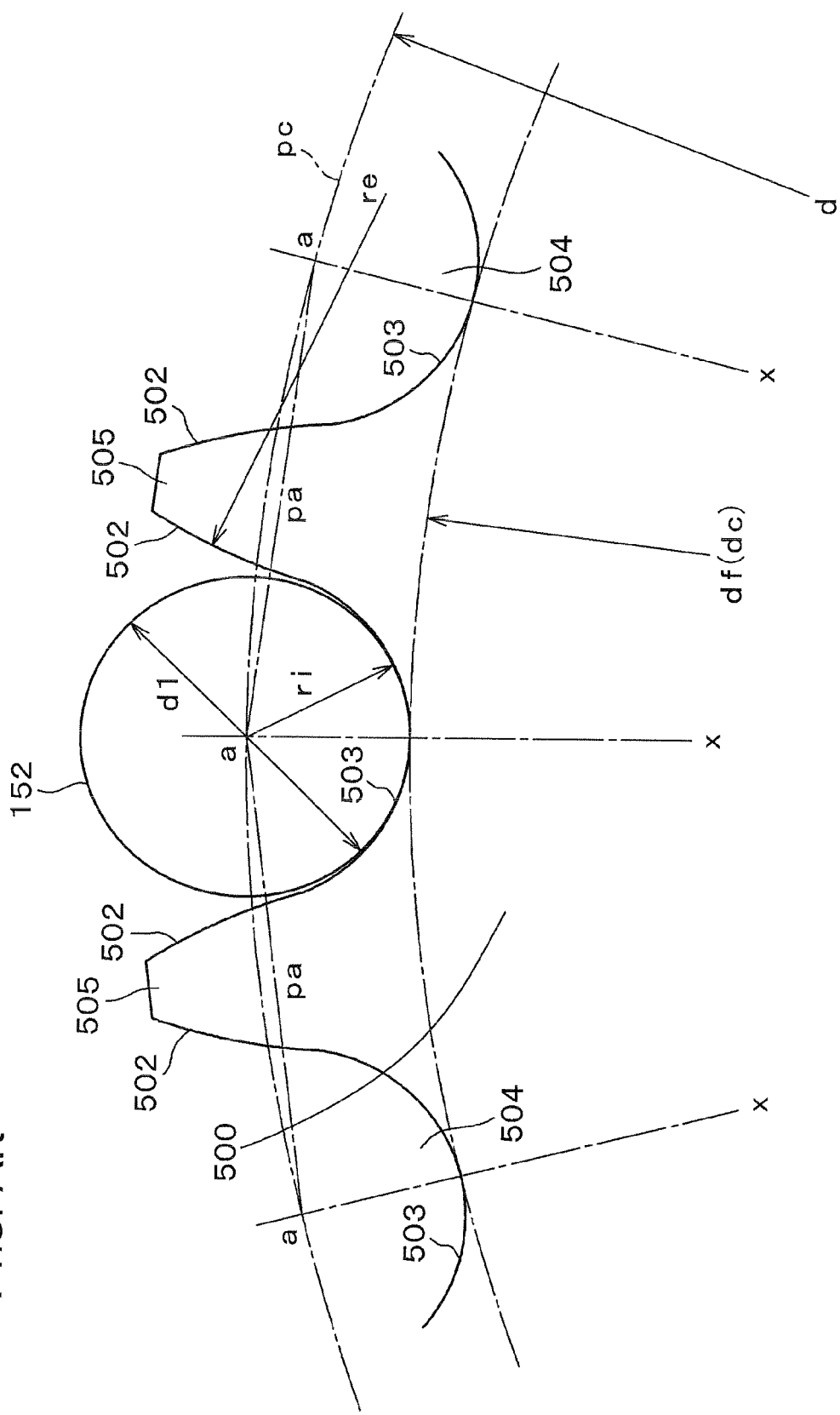
FIG. 6 is an enlarged elevational view of a part of the conventional sprocket and chain.

The tooth forms of the teeth of the sprocket 100 according to the invention are such that a tooth surface 102a on the front side in the rotational direction of the sprocket 100, and the a tooth surface 102b on the back side are symmetrical with respect to the center line X of the intervening tooth gap bottom, i.e., a radial line connecting the rotational center of the sprocket and the center of the tooth gap bottom 103. The tooth surfaces 102a and 102b are both in the form of convex arcs having radii re102a and re102b. These radii, which are equal, are greater than the radius re (FIG. 6) of the arc-shaped tooth surface designed according to the ISO standard. That is, re102a>re and re102b>re.

The tooth gap bottom 103 is in the form of an arc having its center on radial center line x. The arc of the tooth gap bottom 103 has a radius ri103, which is larger than the radius ri (FIG. 6) of the arc-shaped tooth gap bottom designed according to the ISO standard. That is, ri103>ri. It should be understood that the center of the arc ri103 is positioned radially outward, on center line x, from the center of the arc of the standard tooth gap bottom shown in a broken line in FIG. 2.

The tooth gap bottom circle df103 (or dc103) is a circle tangent to the tooth gap bottoms of the sprocket. Its diameter is also referred to as the "root diameter." Since the center of the tooth gap bottom arc of the sprocket of the invention is positioned radially outward relative to the center of the standard tooth gap bottom arc, when the number z of sprocket teeth is an even number, the diameter df103 of the tooth gap bottom circle is larger than a diameter df of the tooth gap bottom circle according to the ISO standard. That is, df103>df. Alternatively, when the number z of sprocket teeth is an odd number, the "caliper diameter" dc103 is larger than the caliper diameter do of the tooth gap bottom circle according to the ISO standard. That is, dc103>do.

Since the diameter df103 of the tooth gap bottom circle, or the caliper diameter dc103, is larger than the diameter df, or the caliper diameter dc, of a sprocket according to the ISO standard, the chordal pitch pa101L of the sprocket 100 (that is, the distance between successive intersections of the pitch circle pc101 with center lines x) is larger than a chordal pitch pa (FIGS. 5 and 6) of the sprocket according to the ISO standard. That is, pa101L>pa.

Figure 5:
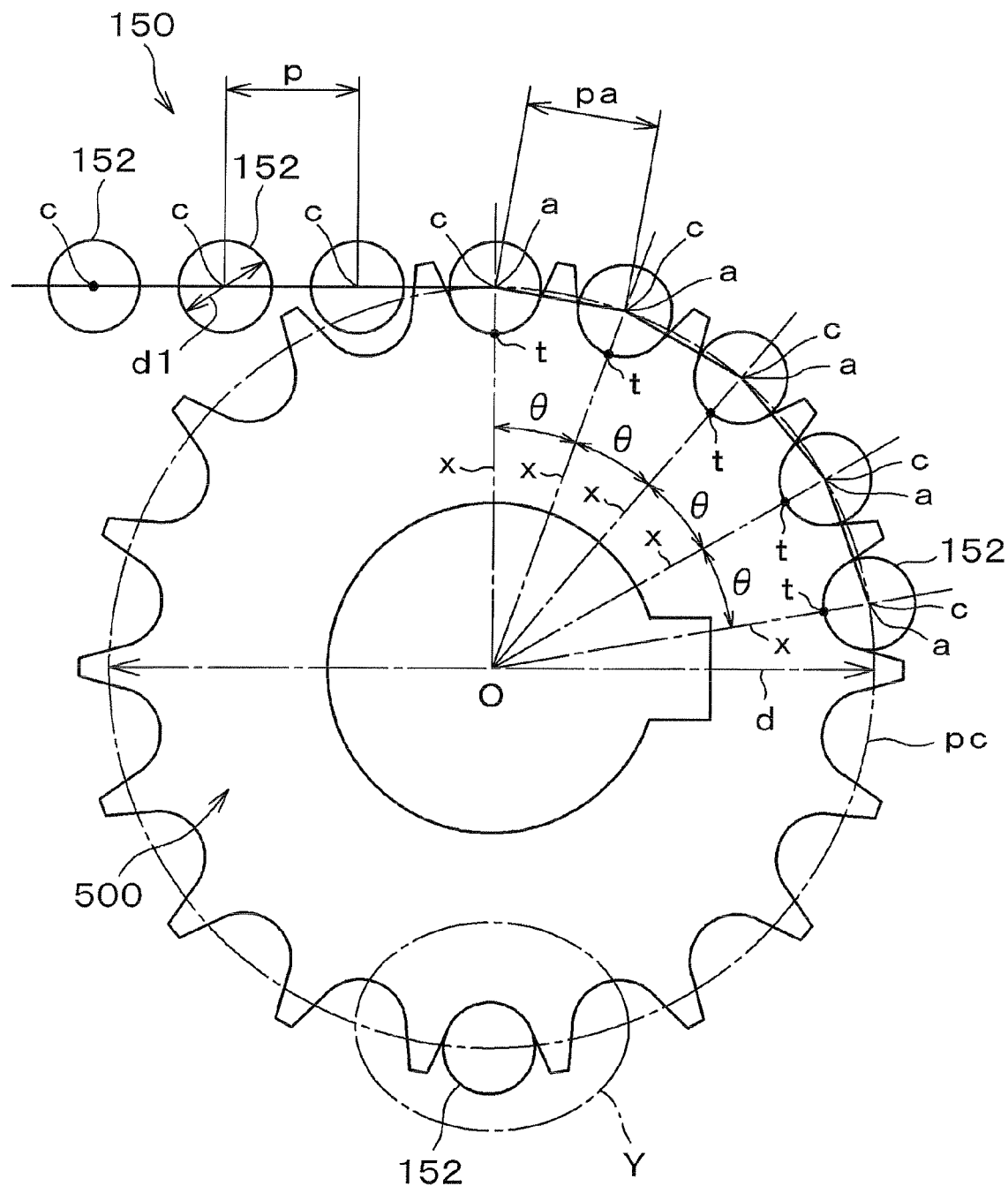
FIG. 5 is an elevational view of a conventional sprocket in mesh with a standard roller chain, the sprocket and chain being in accordance with the ISO standard.

The sprocket 100 is adapted for use with a standard roller chain 150 (FIG. 5). In the case of a standard sprocket, the chordal pitch pa is equal to a chain pitch p (that is, the distance between centers of the rollers 152. On the other hand, the chordal pitch pa101L of the sprocket 100 having teeth 105L with a tooth form pitch angle $\theta+(\Delta\theta/2)$, is larger than the chain pitch p of the standard roller chain 150. That is, pa101L>p.

The standard roller chain 150 has a uniform chain pitch p. Since the sprocket 100 has different tooth form pitch angles, $\theta-\Delta\theta$ and $\theta+(\Delta\theta/2)$, arranged in a pattern along the circumferential direction of the pitch circle pc, when the sprocket 100 is rotated, a following chain roller 152 moves, relative to an already seated preceding roller, through an arc having a radius equal to the chain pitch p. The following roller 152 comes into contact with a tooth surface along a substantially tangential direction, and its kinetic energy is absorbed before impact with the tooth gap bottom. The timing of the abutment is also shifted by virtue of the arrangement of the sprocket teeth. Consequently, not only is impact absorbed, but vibration and noise, at a frequency determined by the number of sprocket teeth, are reduced. As a result, the overall noise generated by the chain transmission is reduced.

The strength of the tooth 105S, which has a pitch angle $\theta-\Delta\theta$, is slightly inferior to that of a tooth 105, having a standard pitch angle $\theta$. However, since the number of teeth 105S on the circumference of the sprocket 100 is small, the overall endurance of the entire sprocket is not materially impaired.

Figure 3:
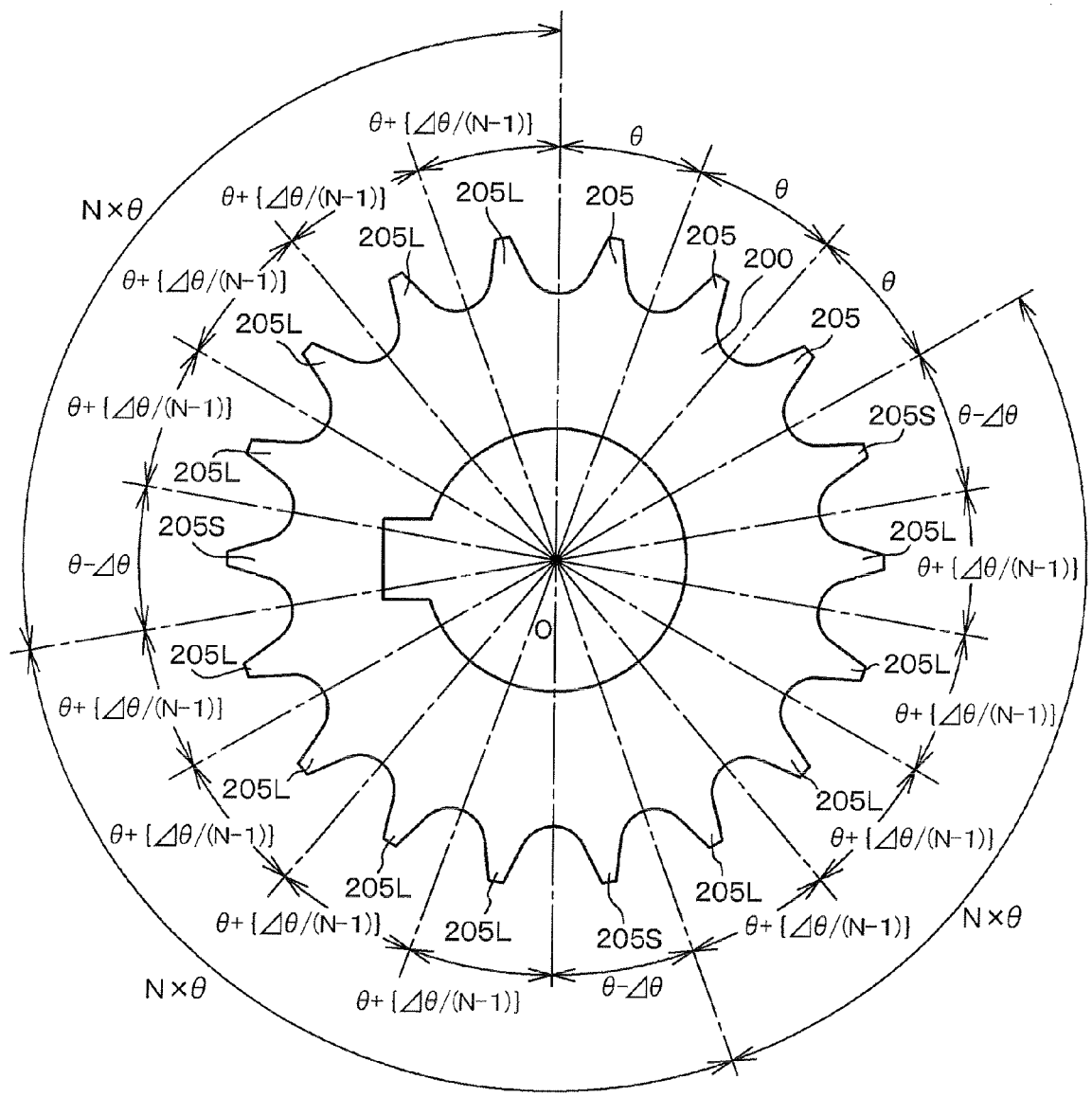
FIG. 3 is an elevational view of a sprocket according to a second embodiment of the invention.

In the embodiment shown in FIG. 3, sprocket 200 has three kinds of teeth having different pitch angles. Teeth 205 have the same pitch angle θ as that of a standard sprocket. Teeth 205S have a pitch angle θ−Δθ, and teeth 205L have a pitch angle θ+(Δθ/(N−1)), where N is the number of teeth in a set composed of Teeth 205S and 205L. In the sprocket 200, there are three sets of teeth, each composed of one tooth 205S, having a pitch angle θ−Δθ and four (i.e., N−1) adjacent teeth 205L, each having a pitch angle θ+(Δθ/(N−1)). All the remaining teeth are teeth 205, having a pitch angle θ.

The total angle of a set of N teeth composed of one tooth 205S, having a pitch angle θ−Δθ, and N−1 teeth 205L, each having a pitch angle θ+(Δθ/(N−1)), is Nθ, the same as the total of the pitch angles of N successive teeth each having the standard pitch angle θ. Teeth 205, 205S and 205L are effectively arranged irregularly arranged along the circumferential direction of the pitch circle. The sprocket has N-1 teeth 205L and one tooth 205S in each set composed of teeth 205L and 205S. The teeth 205L, which have a pitch angle greater than the standard pitch angle θ, are present in a number exceeding the number of teeth 205S, which have pitch angle smaller than the standard pitch angle. The maximum tooth form pitch angle, θ+(Δθ/(N−1)), is less than θ+Δθ.

Here as in the first embodiment, Δθ is preferably less than ¼ of the standard pitch angle θ, so that the pitch angles are all within a range in which a standard chain is able to engage with the sprocket. That is, Δθ<θ/4.

The teeth having the standard angle θ may provided in various numbers and in various positions on the sprocket. When the number of standard sprocket teeth is evenly divisible by N the number of teeth having the standard pitch θ can be zero.

Furthermore, one set or more in a plurality of sets of teeth in the sprocket 200 may be composed of N teeth, each having a pitch angle θ. Thus, in the sprocket, one or more sets of teeth can be composed of one tooth 205S, having a pitch angle θ−Δθ and N−1 teeth 205L, each having a pitch angle θ+(Δθ/(N−1)) may exist. The remaining teeth, having a pitch angle θ may be arranged at any positions.

The tooth form of the teeth of sprocket 200 is the same as that of the teeth of the first embodiment, shown in FIG. 2. Moreover, the manner in which noises are reduced is the same as in the first embodiment.

Figure 4:
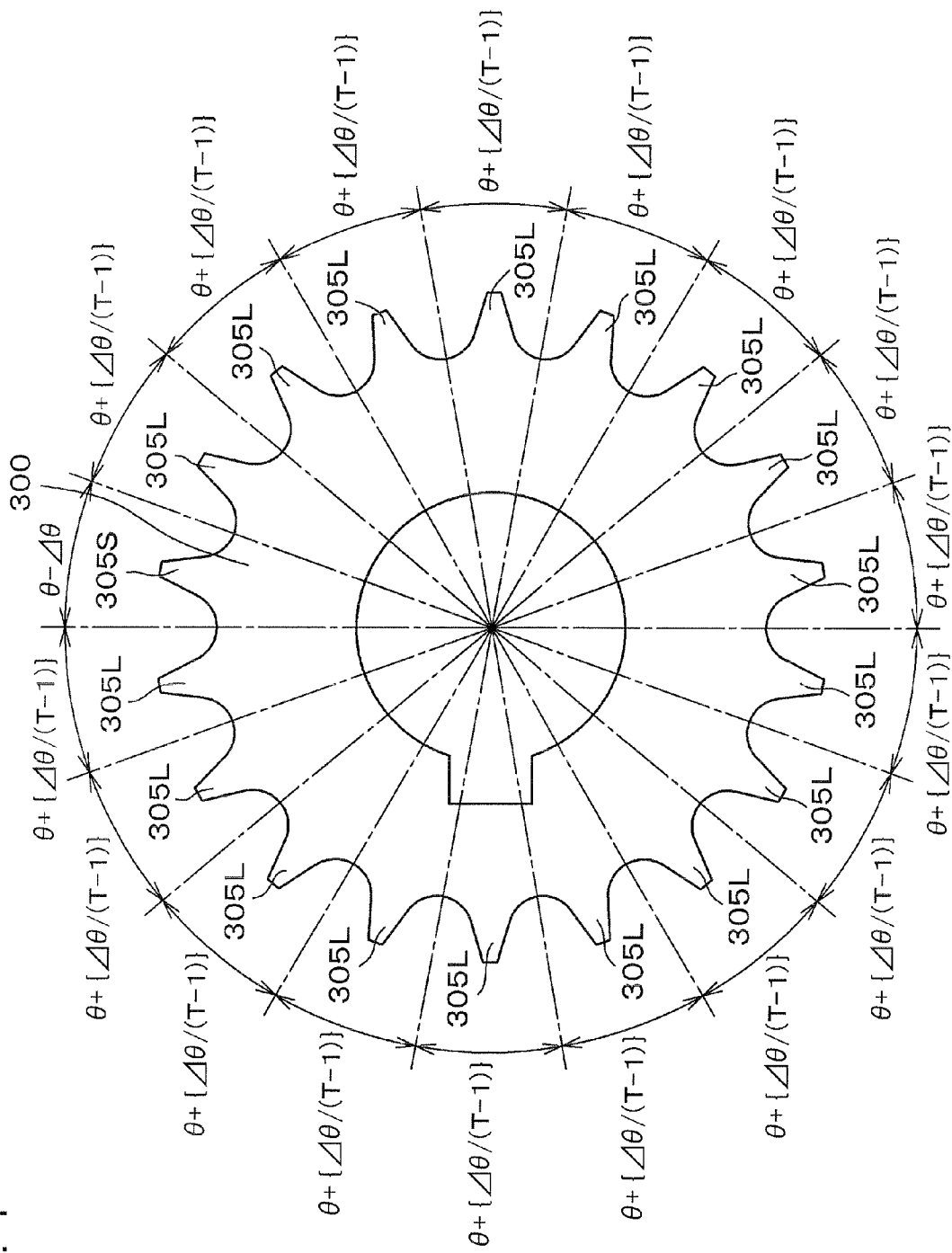
FIG. 4 is an elevational view of a sprocket according to a third embodiment of the invention.

In a third embodiment of the invention, shown in FIG. 4, a sprocket 300 has two kinds of teeth having different pitch angles. One kind of tooth is tooth 305S having a pitch angle θ−Δθ, which is smaller than the standard pitch angle θ, and another kind of tooth is tooth 305L, having a pitch angle θ+(Δθ/(T−1)), which is larger than the standard pitch angle θ. The sprocket 300, comprises one tooth 305S having the pitch angle θ−Δθ, and the all remaining teeth 305L have the pitch angle θ+(Δθ/(T−1)).

The total number of teeth of the sprocket 300 is T, and the total angle is 360°. The tooth 305S, having the pitch angle θ−Δθ becomes an irregularity along the circumferential direction of the pitch circle. Each of the T−1 teeth 305L, has a pitch angle θ+(Δθ(T−1)) larger than the standard pitch angle θ. The maximum of the pitch angle θ+(Δθ/(T−1)) is less than θ+Δθ.

As in the first and second embodiments, Δθ is preferably less than ¼ of the standard pitch angle θ, so that the pitch angles are all within a range in which a standard chain is able to engage with the sprocket. That is, Δθ<θ/4.

The tooth form of the teeth of sprocket 300 is the same as that of the teeth of the first and second embodiments. Moreover, the manner in which noises are reduced is the same as in the first embodiment.

The cases in which the number of teeth having pitch angle greater than the pitch angle of a standard tooth is greater than the number of teeth having a pitch angle smaller than the standard pitch angle, and the cases in which maximum pitch angle is less than θ+Δθ when the standard pitch angle is θ and the minimum pitch angle is θ−Δθ, is not limited to the above-described first, second and third embodiments. When N is the number of teeth having the minimum pitch angle θ−Δθ, and M is the number of teeth having the maximum pitch angle θ+(NΔθ/M), if the relationship N<M is satisfied, any arrangement of the respective teeth may be adopted.

In the embodiments described above, the sprockets have either two or three different pitch angles. However, even if the teeth of a sprocket have four or more pitch angles, if the number of teeth having a larger than standard pitch angle is greater than the number of teeth having a smaller than standard pitch angle, or if a pitch angle of the standard sprocket is set to θ and the minimum pitch angle is set to θ−Δθ, the maximum large pitch angle may be less than θ+Δθ.

In a sprocket in which the teeth have an irregular pitch, it is difficult to form the teeth by machining, rolling, and similar processes. However, in the sprocket according to the invention, even though the teeth have an irregular pitch, manufacture of the sprocket is relatively easy, since the sprocket teeth are molded as an integral, i.e., unitary, part of the sprocket by sintering. Moreover, in a sprocket having an irregular tooth pitch, sliding contact between the sprocket tooth surfaces and the rollers or bushings of a chain takes place at different positions as a result of the irregular sprocket tooth pitch. The variation in the positions at which sliding contact takes place can cause excessive friction noise. However, in the sprocket according to the invention, since the teeth are formed by sintering, the lubricant holding capacity of the sprocket tooth surfaces is improved significantly, and the magnitude of these frictional noises is reduced.

Although the invention has been described as using a standard roller chain 150, the invention may be adapted for use with standard rollerless bushing chain. Furthermore, the sprocket according to the invention can have tooth forms different from those of a standard sprocket. Provided that the diameter of the tooth gap bottom circle (i.e. the root diameter), or the caliper diameter, is larger than the diameter of the tooth gap bottom circle or the caliper diameter of the standard sprocket, even if the tooth form of the sprocket is the same as that of the standard sprocket, the effects of the invention can be obtained.

We claim:

1. A sprocket for a chain drive, the sprocket having teeth separated by grooves for receiving rollers or bushings of a transmission chain, in which, in each said groove, facing tooth surfaces are continuous with a tooth gap bottom, in which the sprocket has a plurality of different pitch angles, said different pitch angles including both pitch angles larger than a standard pitch angle, defined as 360° divided by the number of teeth of the sprocket, and pitch angles smaller than said standard pitch angle, in which the number of pitch angles in the sprocket larger than said standard pitch angle is greater than the number of pitch angles in the sprocket smaller than said standard pitch angle, and in which said teeth are integrally molded as a part of the sprocket by sintering.

2. The sprocket for a chain according to claim 1, in which the root diameter of the sprocket is greater than the root diameter of a standard sprocket having the same pitch circle diameter and the same number of teeth.

3. The sprocket according to claim 1, in which said standard pitch angle is $\theta$, the minimum pitch angle is $\theta-\Delta\theta$, and the maximum pitch angle is less than $\theta+\Delta\theta$.

4. The sprocket for a chain according to claim 3, in which the root diameter of the sprocket is greater than the root diameter of a standard sprocket having the same pitch circle diameter and the same number of teeth.

5. The sprocket according to claim 1, in which said standard pitch angle is $\theta$, the maximum pitch angle is less than $\theta+\Delta\theta$, and $\Delta\theta$ is less than $\theta/4$.

6. The sprocket according to claim 5 in which said teeth of the sprocket include at least one set composed of a number N of successive teeth, in which the standard pitch angle is $\theta$, and in which the pitch angles of each set consist of one pitch angle $\theta-\Delta\theta$ and plural pitch angles $\theta+\Delta\theta/(N-1)$.

7. The sprocket according to claim 6, in which said teeth of the sprocket include a plurality of sets of sprocket teeth, each set having three teeth, and in which the pitch angles of each set consist of one pitch angle $\theta-\Delta\theta$ and two pitch angles $\theta+\Delta\theta/2$.

8. The sprocket according to claim 6, in which the number of teeth of the sprocket is T, and in which the pitch angles of the sprocket consist of one pitch angle $\theta-\Delta\theta$ and T−1 pitch angles $\theta-\Delta\theta/(T-1)$.

\* \* \* \* \*